US012609903B2

(12) United States Patent
Roy et al.

(10) Patent No.: US 12,609,903 B2
(45) Date of Patent: Apr. 21, 2026

(54) SYSTEM OF NETWORK SWITCHES

(71) Applicant: NXP B.V., Eindhoven (NL)

(72) Inventors: Rajeev Roy, Den Bosch (NL); Bernard Francois St-Denis, Ottawa (CA); Stefan Singer, Vaterstetten (DE)

(73) Assignee: NXP B.V., Eindhoven (NL)

( * ) Notice: Subject to any disclaimer, the term of this patent is extended or adjusted under 35 U.S.C. 154(b) by 79 days.

(21) Appl. No.: 18/823,261

(22) Filed: Sep. 3, 2024

(65) Prior Publication Data

US 2025/0158938 A1    May 15, 2025

(30) Foreign Application Priority Data

Nov. 14, 2023    (EP) ..................................... 23209810

(51) Int. Cl.
| | |
|---|---|
| *H04L 49/25* | (2022.01) |
| *H04L 49/00* | (2022.01) |
| *H04L 49/354* | (2022.01) |

(52) U.S. Cl.
CPC .............. *H04L 49/25* (2013.01); *H04L 49/30* (2013.01); *H04L 49/354* (2013.01)

(58) Field of Classification Search
CPC ........ H04L 49/25; H04L 49/30; H04L 49/354
USPC ........................................................ 709/238
See application file for complete search history.

(56) References Cited

U.S. PATENT DOCUMENTS

| | | | | |
|---|---|---|---|---|
| 6,907,469 | B1 * | 6/2005 | Gallo | ....................... H04L 45/00 |
| | | | | 370/395.31 |
| 10,469,382 | B2 | 11/2019 | Yerushalmi et al. | |

| | | | |
|---|---|---|---|
| 10,735,221 | B2 | 8/2020 | Mayer-Wolf et al. |
| 10,951,523 | B2 | 3/2021 | Yerushalmi et al. |
| 2019/0273717 | A1 | 9/2019 | Dearien et al. |
| 2021/0184912 | A1 * | 6/2021 | Robitaille ........... H04L 41/0213 |
| 2021/0203601 | A1 | 7/2021 | Yerushalmi et al. |
| 2022/0174004 | A1 | 6/2022 | Filsfils et al. |
| 2024/0097938 | A1 * | 3/2024 | Shinohara ............... H04L 12/42 |

FOREIGN PATENT DOCUMENTS

| | | | |
|---|---|---|---|
| EP | 4027609 | A1 | 7/2022 |
| WO | WO-2021229658 | A1 | 11/2021 |

OTHER PUBLICATIONS

"IEEE Standard for Local and Metropolitan Area Network— Bridges and Bridged Networks," in€IEEE Std 802.1Q-2018 (Revision of IEEE Std 802.1Q-2014)€, vol. No., pp. Jan. 1993, Jul. 6, 2018.

* cited by examiner

*Primary Examiner* — Wing F Chan
*Assistant Examiner* — Leon Y Tseng

(57)    ABSTRACT

A system comprising: a first and second network switch each comprising a plurality of ports for coupling to one or more devices; wherein the first and second network switches are communicably coupled; wherein the first network switch, based on receipt of a network frame at its ports, is configured to: process the network frame based on its content and a first rule set to determine network frame forwarding information for the network frame; add metadata to the network frame based on the result of said processing; forward the network frame with the added metadata to the second network switch; wherein the second network switch, based on receipt of the network frame, is configured to: read the metadata and process the network frame based on the network frame forwarding information as determined by the first network switch.

20 Claims, 2 Drawing Sheets

SYSTEM OF NETWORK SWITCHES

CROSS-REFERENCE TO RELATED APPLICATIONS

This application claims priority under 35 U.S.C. § 119 to European patent application no. 23209810.3, filed Nov. 14, 2023, the contents of which are incorporated by reference herein.

FIELD

The present disclosure relates to a system comprising a first network switch and a second network switch wherein the first and second network switches are communicably coupled. The disclosure also relates to a system comprising a plurality of network switches. The disclosure also relates to a method of operating the system.

BACKGROUND

Network switches may be coupled together to form a single system. Such a concept is known as switch stacking. Ensuring that the network switches of the system work effectively and efficiently as a single system presents a challenge.

SUMMARY

According to a first aspect of the present disclosure there is provided a system comprising:
 a first network switch comprising a plurality of ports for coupling to one or more devices;
 a second network switch comprising a plurality of ports for coupling to one or more devices;
 wherein the first network switch is communicably coupled with the second network switch;
 wherein the first network switch, based on receipt of a network frame at a first of the plurality of ports, is configured to:
  process the network frame based on content of the network frame and a first rule set of the first network switch to determine a network frame forwarding information for the network frame;
  add metadata to the network frame based on the result of said processing defining said network frame forwarding information for the network frame;
  forward the network frame with the added metadata to the second network switch conditional on an address of the network frame being reachable at or via said second network switch;
 wherein the second network switch, based on receipt of the network frame from the first network switch, is configured to:
  read the metadata and process the network frame based on the network frame forwarding information for the network frame as determined by the first network switch.
In one or more embodiments, the second network switch, at least based on the network frame being received from the first network switch, is configured to process the network frame based on the network frame forwarding information for the network frame as determined by the first network switch in preference to the second network switch processing the network frame based on the content of the network frame and a second rule set of the second network switch.

In one or more embodiments, the network frame forwarding information determined by said processing by the first network switch comprises: an instruction to change to a virtual local area network, VLAN, tag of the network frame and the metadata comprises an instruction for the second network switch to execute the change.

In one or more embodiments, the change in the VLAN tag comprises one or both of a change in the a VLAN identifier field and a change in a priority code point field.

In one or more embodiments, the network frame forwarding information determined by said processing by the first network switch designates: a quality of service and wherein the second network switch is configured to process the network frame based on the quality of service determined by the first network switch.

In one or more embodiments, the network frame forwarding information determined by said processing by the first network switch comprises a time stamp designating when the network frame was received by the first network switch.

In one or more embodiments, the network frame forwarding information determined by said processing by the first network switch comprises a time stamp designating when the network frame was transmitted from the first network switch. In one or more embodiments, the network frame forwarding information determined by said processing by the first network switch comprises a request for the second network switch to reply with a second network frame that includes a timestamp indicating when the second network switch received and/or transmitted the network frame.

In one or more embodiments, the network frame forwarding information determined by said processing by the first network switch comprises a port mirroring instruction and wherein the second network switch is configured to create a copy of the network frame based on the port mirroring instruction for forwarding according to the port mirroring instruction.

In one or more embodiments, the second network switch is configured to include the added metadata in the copy of the network frame.

In one or more embodiments, the system includes a third network switch comprising a plurality of ports for coupling to one or more devices, the third network switch communicatively coupled with the second network switch, wherein the second network switch is configured to:
 based on the network frame being destined for a device of the one or more devices coupled to the plurality of ports, remove said metadata and forward the network frame to the device; and
 based on the network frame being destined for a device coupled to the third network switch, retain said metadata and forward the network frame to the third network switch.

In one or more embodiments, the second network switch is provided with a second rule set defining one or more rules to process the metadata added by the first network switch.

In one or more embodiments, the system includes a management device configured to program the first rule set of the first network switch and the second rule set of the second network switch.

In one or more embodiments, the metadata is added to a header of the network frame or a trailer of the network frame.

In one or more embodiments, the first network switch being configured to forward the network frame with the added metadata comprises one or more of:
 forwarding based on a MAC address of the network frame;

forwarding based on an IP address specified in the content of the network frame;

forwarding to a specific one of the plurality of ports based on an indication in the network frame that it is part of a stream, wherein the specific one of the ports is established by an earlier received network frame or predetermined rule; and forwarding based on one or more fields of a header or a payload of the network frame.

According to a second aspect of the present disclosure there is provided an automotive based network comprising the system of the first aspect.

According to a third aspect of the present disclosure there is provided a method for processing a network frame in a system comprising a first network switch comprising a plurality of ports for coupling to one or more devices; a second network switch comprising a plurality of ports for coupling to one or more devices; and wherein the first network switch is communicably coupled with the second network switch; wherein the method comprises:

receiving, by the first network switch, a network frame at a first of the plurality of ports;

processing, by the first network switch, the network frame based on content of the network frame and a first rule set of the first network switch to determine a network frame forwarding rule for the network frame;

adding, by the first network switch, metadata to the network frame based on the result of said processing defining said network frame forwarding information for the network frame;

forwarding, by the first network switch, the network frame with the added metadata to the second network switch conditional on an address of the network frame being reachable at or via said second network switch;

receiving, by the second network switch, the network frame from the first network switch;

reading, by the second network switch, the metadata; and processing, by the second network switch, the network frame based on the network frame forwarding information for the network frame as determined by the first network switch.

In one or more examples, the method includes processing, by the second network switch, at least based on the network frame being received from the first network switch, the network frame based on the network frame forwarding information for the network frame as determined by the first network switch in preference to the second network switch processing the network frame based on the content of the network frame and a second rule set of the second network switch.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

4

BRIEF DESCRIPTION OF THE DRAWINGS

One or more embodiments will now be described by way of example only with reference to the accompanying drawings in which.

DETAILED DESCRIPTION

The embodiments described relate to a system comprising a plurality of network switches, also referred to as network bridges, that are communicatively coupled together to form a network. The plurality of network switches may be configured to operate together as a single logical network switch. Accordingly, the network switches of the system may be centrally controlled by a single management device. In other examples, multiple management devices or hosts may be provided, and, in some examples, the management devices may share management functions of the system. In some examples, the system may be considered to comprise a plurality of stacked network switches or a distributed switch architecture.

Figure 1:
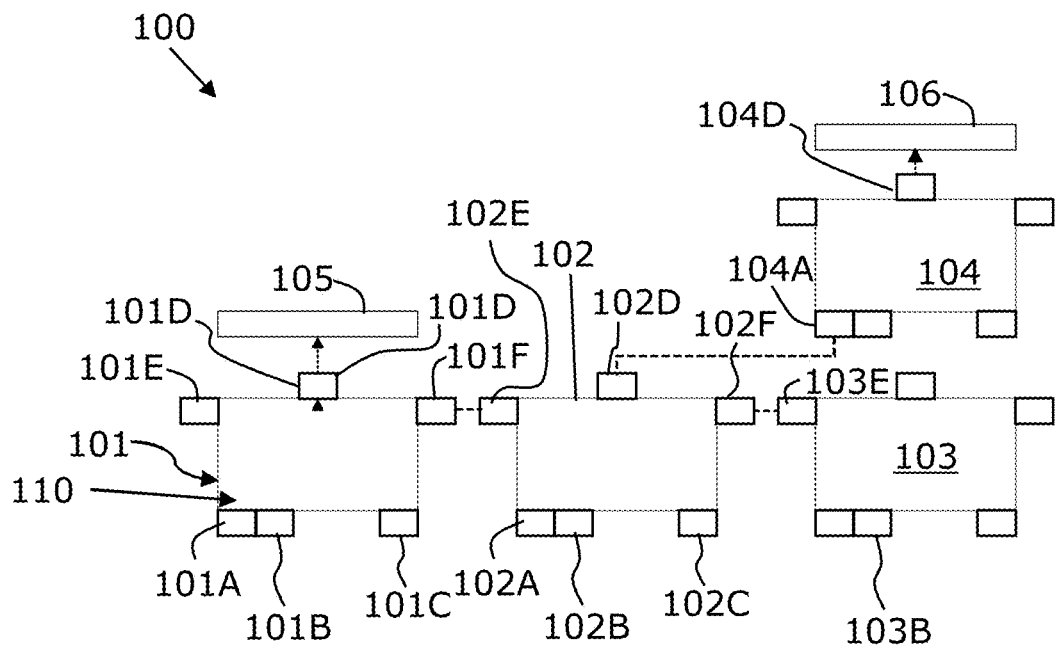
FIG. 1 shows an example embodiment of a system comprising a plurality of network switches communicatively coupled together.

FIG. 1 shows an example system 100. In the present example, the system 100 provides at least part of an automotive communication network for a vehicle, although the application has wider application. The system comprises a first network switch 101, a second network switch 102, a third network switch 103 and a fourth network switch 104 in this example. Each of the network switches 101-104 comprise a plurality of ports for coupling to one or more devices. In the present example each switch has six ports, although other numbers of ports may be present and each switch does not necessarily need the same number of ports as another network switch. In general, each switch has a plurality of ports to support different topologies. The first network switch 101 is shown with six ports 101A-101F. Likewise, the second network switch 102 is shown with six ports 102A-102F. The third and fourth network switches, in the present example, also have six ports, but only some of them are labelled for reasons of clarity.

The ports 101A-F, 102A-F, 103B, 103E, 104A, 104D are configured to be coupled to one or more devices, thereby enabling the devices to communicate. For example, a fourth port 101D of first network switch 101 is shown coupled to a local host 105 which may comprise a single device such as a sensor or a vehicle sub-system. A fourth port 104D of the fourth network switch 104 is shown coupled to a remote host 106. The remote host 106 may host a plurality of devices that all communicate via the fourth port 104D of the fourth network switch 104.

The first network switch 101 is communicably coupled with the second network switch by way of a connection between a sixth port 101F of the first network switch and a fifth port 102E of the second network switch 102. The second network switch 102 is communicably coupled with the third network switch 103 by way of a connection between a sixth port 102F of the second network switch and a fifth port 103E of the third network switch 103. The fourth network switch 104 is communicatively coupled to the second network switch 102 by way of a connection between a fourth port 102D and a first port 104A. In some examples, dedicated network switch coupling ports using any required protocol may be provided to couple the network switches.

Also, other topologies are possible. In summary, in the present example, at least one of the plurality of ports of each network switch 101-104 communicatively couples it to a port of a further switch of the system 100.

Each network switch 101-104 may have a processor or other hardware configured to provide the conventional packet/network frame switching functions of a network switch or network bridge. The processor may comprise a CPU, ASIC or FPGA for performing the switching functions. Each network switch 101-104 may include a processor for configuring the network switch and hardware for performing the conventional packet/network frame switching functions. Each network switch 101-104 may include memory for storing a forwarding database. The forwarding database, as will be known to those skilled in the art, may maintain a record of destination addresses, such as MAC and/or IP addresses of the devices coupled to each port such that the network switch can forward a network frame received at one of its ports to a different one of its port such that it reaches the device addressed by the network frame or reaches another one of the network switches that further forwards it to its destination. In other examples, the forwarding database may maintain a record of specific combinations of headers or specific fields of the frame, including payload, for forwarding decisions to specific ports. The term network frame is used to refer to the protocol data units processed by the network switches, although it will be appreciated that the network switches of the examples may perform switching at layer 3 and therefore the term network frame is intended to cover a network packet and switching at layer 2, 3 or even layer 4 or higher of the OSI model.

In general terms, network switches may also perform network function processing of the network frames passing through them. Network function processing may include processing Virtual Local Area Network, VLAN, tags, and/or performing traffic management functions. For example, the network switches may assign or determine a priority of a network frame and, based on the priority, may forward the network frame ahead of or after another network frame. The network function processing may be quality of service related functions. For example, the network switches may process information relating to a transmission priority and/or a discard resiliency (i.e. how discardable is frame based on the congestion level experienced on a queue) of network frames. Thus, network switches, in some examples, may be required to maintain large registers defining network function rules to process the network frames in order to perform their network function processing role. Also, when the network function rules change, the management device is required to update the registers in each network switch, which can be inefficient. Further, the memory and/or processing resources in network switches are limited and therefore ensuring the efficient use of memory and processing resources is a challenge. Further, the system 100 may be part of a vehicle and, as per the Software Defined Vehicles (SDV) concept, the updating of network switch functionality may be a mandated feature. Such updates could be driven because of a feature update (Function on Demand) or in response to fixing issues, which may be typical in Intrusion Detection and Prevention Systems (IDPS).

Returning to the present example, the first network switch 101 may receive a network frame 110 or packet at its first port 101A, for example. We will describe the actions performed by the system 100 of the present embodiment based on the first switch receiving the network frame. However, it will be appreciated that any one of the plurality of network switches 101-104 may be the first to receive the network frame into the system 100.

The first network switch 101 receives the network frame at the first port 101A, for example only, and is configured to process the network frame in addition to providing packet/frame switching to forward the network frame to a different one of its plurality of ports 101B-101E based on the destination address (e.g. MAC or IP address) designated in the network frame/packet. The first network switch 101 may receive the network frame from a device coupled to the port 101A but in other examples it could receive the network frame from another network switch.

In particular, the first network switch 101 is configured to process the network frame based on content of the network frame and a first rule set of the first network switch to determine network frame forwarding information for the network frame. The determination of the network frame forwarding information is in addition to any determination of which port of the network switch the network frame should be forwarded to.

This frame forwarding information may define the addition or modification of VLAN tags; addition or modification of fields designating the priority of the network frame; addition or modification of fields designating the discardability of the network frame; addition and/or modification of one or more timestamps to the network frame indicative of, for example, time of receipt or time of forwarding of the network frame; the forwarding of the network frame to one or more hosts; mirroring of the network frame to be performed at a different one of the network switches; and/or other functions that are additional to the determination of the outgoing port for the network frame. Examples of such processing will be described in examples below.

The first network switch 101 is configured to add metadata to the network frame based on the result of said processing. Thus, the metadata defines or specifies said network frame forwarding information that was determined for the network frame. In the present example, the metadata is added to a header of the network frame. However, in other examples, it may be added to a trailer of the network frame. The metadata may comprise an index for referencing a predefined action that is stored in a memory of the second network switch 102 or any other network switch 103, 104 of the system. The metadata may comprise an instruction that is executable by the second network switch with or without reference to a look-up table. In particular, in some examples, the metadata may be processed without reference to a large set of look up tables and, instead, a small database may be used to process specific actions as indicated by the metadata.

The first network switch 101 is configured to perform its forwarding function based on a destination address, typically a MAC address or IP address or VLAN ID, designated in the network frame, or one or more other fields, as mentioned above. Accordingly, as it conventional, the first network switch 101 will determine or be programmed with which destination addresses are reachable from each of its plurality of ports 101A-101E by way of a forwarding database.

In the present example, the first network switch 101 may forward the network frame with the added metadata to the second network switch 102 via the ports 101F and 102E conditional on the address of the network frame being reachable at or via said second network switch. The metadata may be added in the header or trailer. The MAC address may designate a device coupled to one of the ports of the second network switch 102. Alternatively, the MAC address may designate a device coupled to either the third or fourth network switches 103, 104, to which the second network switch 102 will be configured to forward the network frame.

When the second network switch 102 receives the network frame it is configured to read the metadata added by the first network switch and process the network frame based on the network frame forwarding information for the network frame as determined by the first network switch 101. In some examples, the second network switch may be programmed to action any instructions contained in the metadata. In other examples, the second network switch 102 may include predetermined information, such as a second rule set for interpreting the metadata and performing any predefined actions that may be required.

Thus, in one or more examples, rather than the second network switch 102 requiring a comprehensive second rule set (such as equivalent to the first rule set) to determine what the network frame forwarding information should be, it uses the output of the processing performed by the first network switch, i.e. the network frame forwarding information, to process the network frame. Thus, the processing performed by the first network switch 101 which receives the network frame first, in this example, does not need to be performed again by the second network switch 102. Processing resources are therefore used more efficiently. Further, the network frame forwarding information may comprise one or more instructions to be performed by the second network switch 102. Thus, the first network switch 101 is provided with a mechanism for instructing the second network switch 102 or any other network switch 103, 104 of the system 100 to action whatever network frame processing it determines is required.

Thus, the second network switch 102, at least based on the network frame being received from another network switch of the system, is configured to process the network frame (i.e. in addition to processing performed for port forwarding based on the destination address) based on the metadata, in preference to the second network switch processing the network frame based on the content of the network frame and a comprehensive second rule set of the second network switch. In this way, network frames that are received from other network switches in the system 100 (or at least one or more of the switches of the system 100) are processed based on the metadata, whereas network frames received from ports e.g. 102A-102C not coupled to another network switch may be processed such that the second network switch 102 is configured to determine the network frame forwarding information (e.g. in addition to processing performed for port forwarding based on the destination address or other fields). It has been found that the second rule set can be more space efficient when containing information for carrying our instructions contained in the metadata rather than independently processing the network frame. Further the rule sets for the network switches 101-104 can be defined based on the position of the network switch in the system 100. Thus, the rule set for each network switch 101-104 may only include rules applicable to network frames that are likely to be encountered by the network switch, such as from the devices coupled to its ports. The way the frames should be handled by other network switches in the system, can be provided in the network frame forwarding information provided in the metadata.

In some examples, even if the second network switch 102 is configured to or capable of determining the network frame forwarding information corresponding to that defined in the metadata, the second network switch 102 is configured to simply processes the network frame according to the metadata. This functionality may have further benefits for different network topologies.

For example, if the first network switch 101 is coupled to a modem or telematics unit it may be at a higher risk of attack. Accordingly, the first rule set of the first network switch 101 may need to be more comprehensive and the processing performed by the first network switch 101 may need to be more robust. However, once the processing is performed, the network frame forwarding information of the metadata can simply instruct the other network switches 102-104 how to handle the network frame, rather than having a need for re-processing the network frame.

It will be appreciated that the first network switch may apply this functionality to all or some of the network frames. For example, in some network implementations, the network frames may require forwarding based on a source or destination MAC address of the network frame or other layer 2 designation i.e. the frame is bridged such as defined in IEEE 802.1Q. The additional processing may be applied to such frames. In some examples, the network frame may be an Internet Protocol packet and therefore the IP packet may require forwarding based on a source or destination IP address or other layer 3 designation, i.e. IP routed. The additional processing may be applied to such frames. In some examples, the network frame may require forwarding to a specific one of the plurality of ports based on an indication in the network frame that it is part of a stream, wherein the specific one of the ports is established by an earlier received network frame or predetermined rule, i.e. stream forwarding. The additional processing may be applied to one or more or all of such frames of the stream. It will be appreciated by those skilled in the art that network frame forwarding may be performed based on more than the MAC or IP address or alternative fields.

We will now describe several examples of the processing that may be performed by the first network switch 101 and therefore what network frame forwarding information is determined. It will be appreciated that the processing may relate to one or a combination of the examples below.

In a first example, the network frame forwarding information determined by the processing performed by the first network switch may relate to VLAN. For example, the network frame forwarding information may comprise an instruction to change or add to a virtual local area network, VLAN, tag of the network frame. Accordingly, the metadata may comprises an instruction for the second network switch 102 or other switch 103, 104 of the system 100 to execute the change. The VLAN tag may comprises comprise a VLAN identifier field and/or a change in a priority code point field. Thus, the processing may comprise VLAN ID re-tagging or PCP remarking.

In a second example, the network frame forwarding information determined by said processing by the first network switch 101 designates a quality of service. Accordingly, the second network switch 102 or other switch 103, 104 of the system 100 is configured to process the network frame based on the quality of service determined by the first network switch. Thus, the processing may derive an implicit priority from a field of the network frame, such as when egress queueing.

In a third example, the network frame forwarding information determined by said processing by the first network switch 101 designates a time stamp indicative of when the network frame was received by the first network switch 101. The time stamp may be added in response to an instruction contained in the network frame or a determination that the network frame is of a particular type. In some examples, the time stamp added by the first network switch may be used by the second network switch when forwarding the network frame to a device coupled to the second network switch 102, such as in preference to a time when the second network switch 102 received the network frame. In one or more embodiments, the network frame forwarding information determined by said processing by the first network switch comprises a time stamp designating when the network frame was transmitted from the first network switch, such as to the second network switch. The time stamp may be added in response to an instruction contained in the network frame or a determination that the network frame is of a particular type. In some examples, the time stamp added by the first network switch may be used by the second network switch when forwarding the network frame to a device coupled to the second network switch 102. In one or more embodiments, the network frame forwarding information determined by said processing by the first network switch comprises a request for the second network switch to reply with a second network frame that includes a timestamp indicating when the second network switch transmitted the network frame. Thus, the first network switch 101 may receive a network frame from a device or host coupled to one of its ports. Then, based on an instruction from the host, or based on a property of the network frame received by the first network switch 101 from the host, the first network switch 101 may be configured to determine the network frame forwarding information and add the corresponding metadata that comprises an instruction to cause a different network switch, such as the second network switch 102, to report back to the host with a time stamp indicative of when the different network switch (e.g. second network switch 102) received and/or transmitted the network frame. Thus, when the second network switch 102 transmits the network frame on its onward journey, it is configured to execute the instruction in the metadata by generating the second network frame addressed to the host and including, perhaps in the metadata, a time stamp indicative of when it transmitted the network frame on its onward journey, such as to a different host or to another network. The time stamp may thus indicate when the network frame was transmitted from one of the outgoing ports of the second network switch 102. Such an instruction may also be executed by any further network switches of the system 100 should the network frame be forwarded through further network switches of the system 100. The provision of metadata to indicate or collect time stamps from network switches of the system 100, as described in this third example, may be advantageous for management of the system 100.

In a fourth example, the network frame forwarding information determined by said processing by the first network switch 101 comprises a port mirroring instruction. Thus, rather than the first network switch 101 creating a copy of the network frame for mirroring purposes, the second network switch or other switch 103, 104 of the system is configured to create a copy of the network frame based on the port mirroring instruction contained in the metadata. The second network switch may then forwarding the network frame and its copy according to one or more rules or as defined in the port mirroring instruction. This is advantageous as the creation of the mirrored frame can be delayed until it reaches the desired network switch of the system 100 rather than routing multiple, mirrored, frames through the network switches 101, 102, 103, 104 of the network.

The network frame forwarding information may comprise an instruction for a directly coupled network switch, such as network switch 102 relative to first network switch 101, or for an indirectly coupled network switch, such as third or fourth network switch 103, 104. Accordingly, the second network switch may be configured to include the added metadata in the network frame when it forwards it to an outgoing port. Further the metadata may be retained in any mirrored copies should they have been created.

In some examples, the second network switch 102 may be configured to, based on the network frame being destined for a device coupled to the plurality of ports 102A-102C, remove said metadata and forward the network frame to the device. However, if the network frame being destined for a device coupled to a different network switch, such as for forwarding to the ports 102D and 102F, the second network switch may retain said metadata when forwarding the network frame to the port 102D, 102F of the further network switch 103, 104.

The system 100 may include one (although it could be more than one) management device configured to program or update the first rule set of the first network switch 101 and the second rule set of the second network switch 102 and the corresponding rule sets of the other network switches 103, 104. The programming of changes can be made more efficient by the rule sets being configured to follow instructions in the metadata rather than every switch processing the network frames. Thus, over the air updates may only need to update a subset of the network switches.

Figure 2:
FIG. 2 shows example network frames.
Figure 2:
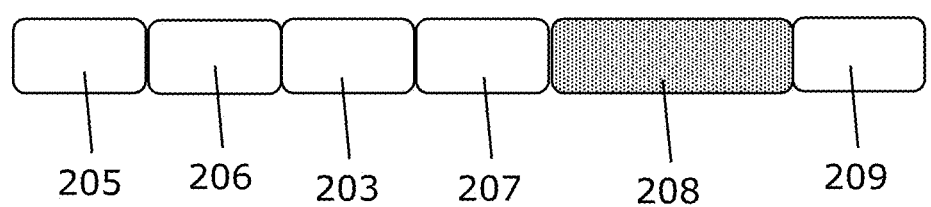
Figure 2:
Figure 2:
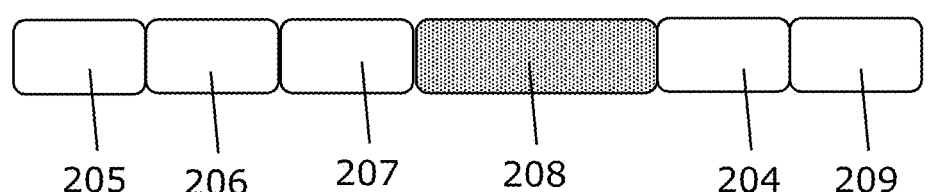

FIG. 2 illustrates two example network frame formats 200 and 201. The metadata may be provided in the header (before the payload), such as in field 203 of the first example frame format. In the second example frame format 201, the metadata is provided in a trailer (after the payload), such as in field 204. The other fields shown comprise a destination address 205, such as a MAC destination address or other layer-2 address; a source address, such as a MAC source address or other layer-2 address; a OSI layer-2 header 207, which may include information such as a VLAN tag; a payload 208 which may include data including OSI layer-3 headers, such as IP related fields; and a frame check sequence 209. In some examples, the metadata is carried in both the header 203 and the trailer 204 field of the same network frame. The metadata, in one or more examples, designates an index, such as a number, that corresponds to a desired action that should be performed by the receiving network switch. Accordingly, the rule set can be compact and perform actions based on instruction indicated by the metadata or by an index that refers to such instructions.

Figure 3:
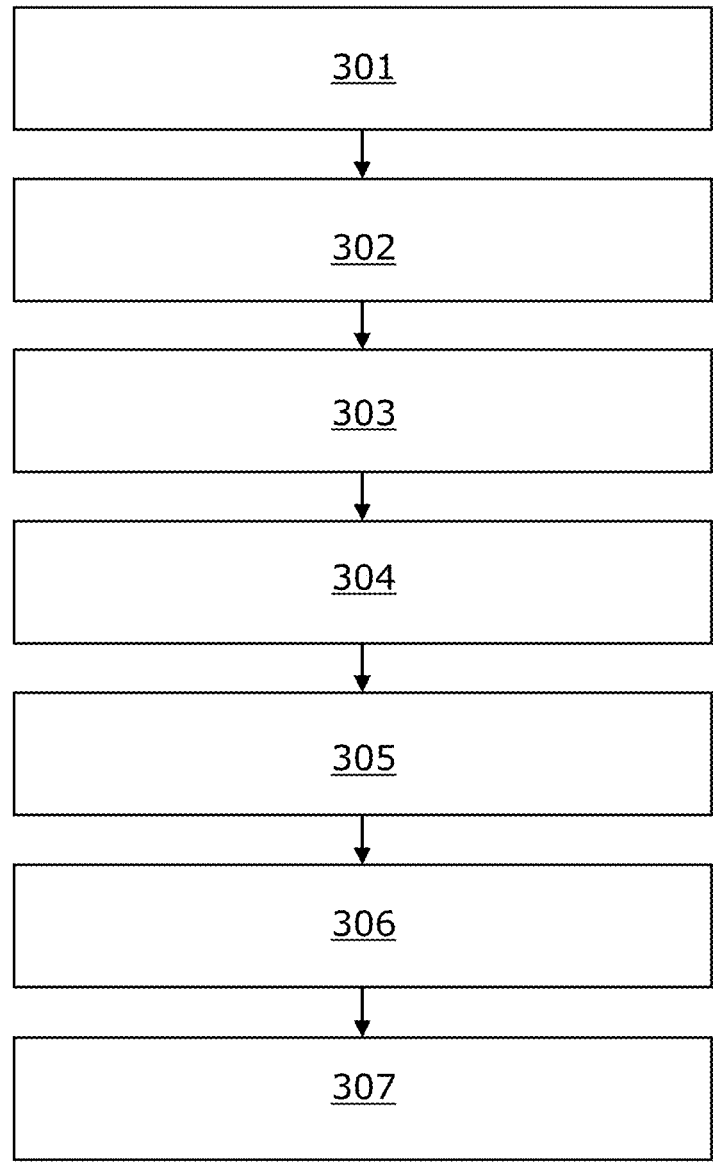
FIG. 3 shows a flowchart illustrating an example method.

FIG. 3 illustrates an example method for processing a network frame in a system comprising a plurality of network switches each comprising a plurality of ports for coupling to one or more devices, such as shown in FIG. 1. The method comprises:

receiving 301, by the first network switch, a network frame at a first of the plurality of ports;

processing 302, by the first network switch, the network frame based on content of the network frame and a first rule set of the first network switch to determine a network frame forwarding rule for the network frame;

adding 303, by the first network switch, metadata to the network frame based on the result of said processing defining said network frame forwarding information for the network frame;

forwarding 304, by the first network switch, the network frame with the added metadata to the second network switch conditional on an address of the network frame being reachable at or via said second network switch;

receiving 305, by the second network switch, the network frame from the first network switch;

reading 306, by the second network switch, the metadata; and processing 307, by the second network switch, the network frame based on the network frame forwarding information for the network frame as determined by the first network switch.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A system comprising:
a first network switch comprising a plurality of ports for coupling to one or more devices; and
a second network switch comprising a plurality of ports for coupling to one or more devices;
wherein the first network switch is communicably coupled with the second network switch;
wherein the first network switch, based on receipt of a network frame at a first of the plurality of ports, is configured to:
process the network frame based on content of the network frame and a first rule set of the first network switch to determine a network frame forwarding information for the network frame;
add metadata to the network frame based on the result of said processing of the network frame, the metadata defining said network frame forwarding information for the network frame; and
forward the network frame with the added metadata to the second network switch conditional on an address of the network frame being reachable at or via said second network switch; and
wherein the second network switch, based on receipt of the network frame from the first network switch, is configured to:
read the metadata and process the network frame based on the network frame forwarding information for the network frame as determined by the first network switch.

2. The system of claim 1, wherein the second network switch, at least based on the network frame being received from the first network switch, is configured to process the network frame based on the network frame forwarding information for the network frame as determined by the first network switch in preference to the second network switch processing the network frame based on the content of the network frame and a second rule set of the second network switch.

3. The system of claim 1, wherein the network frame forwarding information determined by said processing by the first network switch comprises:
an instruction to change a virtual local area network, VLAN, tag of the network frame and the metadata comprises an instruction for the second network switch to execute the change.

4. The system of claim 3, wherein the change in the VLAN tag comprises one or both of a change in a VLAN identifier field and a change in a priority code point field.

5. The system of claim 1, wherein the network frame forwarding information determined by said processing by the first network switch designates:
a quality of service and wherein the second network switch is configured to process the network frame based on the quality of service determined by the first network switch.

6. The system of claim 1, wherein the network frame forwarding information determined by said processing by the first network switch comprises one or more of:
a time stamp designating when the network frame was received by the first network switch;
a time stamp designating when the network frame was transmitted from the first network switch; or a request for the second network switch to reply with a second network frame that includes a timestamp indicating when the second network switch transmitted the network frame.

7. The system of claim 1, wherein the network frame forwarding information determined by said processing by the first network switch comprises a port mirroring instruction and wherein the second network switch is configured to create a copy of the network frame based on the port mirroring instruction for forwarding according to the port mirroring instruction.

8. The system of claim 7, wherein the second network switch is configured to include the added metadata in the copy of the network frame.

9. The system of claim 1, wherein the system includes a third network switch comprising a plurality of ports for coupling to one or more devices, the third network switch communicatively coupled with the second network switch, and wherein the second network switch is configured to:

based on the network frame being destined for a device of the one or more devices coupled to the plurality of ports, remove said metadata and forward the network frame to the device; and based on the network frame being destined for a device coupled to the third network switch, retain said metadata and forward the network frame to the third network switch.

10. The system of claim 1, wherein the second network switch is provided with a second rule set defining one or more rules to process the metadata added by the first network switch.

11. The system of claim 10, wherein the system includes a management device configured to program the first rule set of the first network switch and the second rule set of the second network switch.

12. The system of claim 1, wherein the metadata is added to a header of the network frame or a trailer of the network frame.

13. The system of claim 1, wherein the first network switch being configured to forward the network frame with the added metadata comprises one or more of:

forwarding based on a MAC address of the network frame;

forwarding based on an IP address specified in the content of the network frame;

forwarding to a specific one of the plurality of ports based on an indication in the network frame that it is part of a stream, wherein the specific one of the ports is established by an earlier received network frame or predetermined rule; or forwarding based on one or more fields of a header or a payload of the network frame.

14. An automotive based network comprising the system of claim 1.

15. A method for network frame processing in a system that includes a first network switch comprising a plurality of ports for coupling to one or more devices, and a second network switch comprising a plurality of ports for coupling to one or more devices, wherein the first network switch is communicably coupled with the second network switch, and wherein the method comprises:

receiving, by the first network switch, a network frame at a first of the plurality of ports;

processing, by the first network switch, the network frame based on content of the network frame and a first rule set of the first network switch to determine a network frame forwarding rule for the network frame;

adding, by the first network switch, metadata to the network frame based on the result of said processing of the network frame, the metadata defining said network frame forwarding information for the network frame;

forwarding, by the first network switch, the network frame with the added metadata to the second network switch conditional on an address of the network frame being reachable at or via said second network switch;

receiving, by the second network switch, the network frame from the first network switch;

reading, by the second network switch, the metadata; and processing, by the second network switch, the network frame based on the network frame forwarding information for the network frame as determined by the first network switch.

16. The method of claim 15, including processing, by the second network switch, at least based on the network frame being received from the first network switch, the network frame based on the network frame forwarding information for the network frame as determined by the first network switch in preference to the second network switch processing the network frame based on the content of the network frame and a second rule set of the second network switch.

17. The method of claim 15, wherein the network frame forwarding information determined by said processing by the first network switch comprises an instruction to change a virtual local area network, VLAN, tag of the network frame, and the metadata comprises an instruction for the second network switch to execute the change.

18. The method of claim 17, wherein the change in the VLAN tag comprises one or both of a change in a VLAN identifier field and a change in a priority code point field.

19. The method of claim 15, wherein the network frame forwarding information determined by said processing by the first network switch designates a quality of service, and wherein the second network switch is configured to process the network frame based on the quality of service determined by the first network switch.

20. The method of claim 15, wherein the network frame forwarding information determined by said processing by the first network switch comprises one or more of:

a time stamp designating when the network frame was received by the first network switch;

a time stamp designating when the network frame was transmitted from the first network switch; or a request for the second network switch to reply with a second network frame that includes a timestamp indicating when the second network switch transmitted the network frame.

\* \* \* \* \*